April 27, 1954　　　E. F. KRIEGER　　　2,676,566
HEN NEST BATTERY

Filed March 25, 1949　　　　　　　　　3 Sheets-Sheet 1

INVENTOR.
Edward F. Krieger
BY
ATTORNEYS

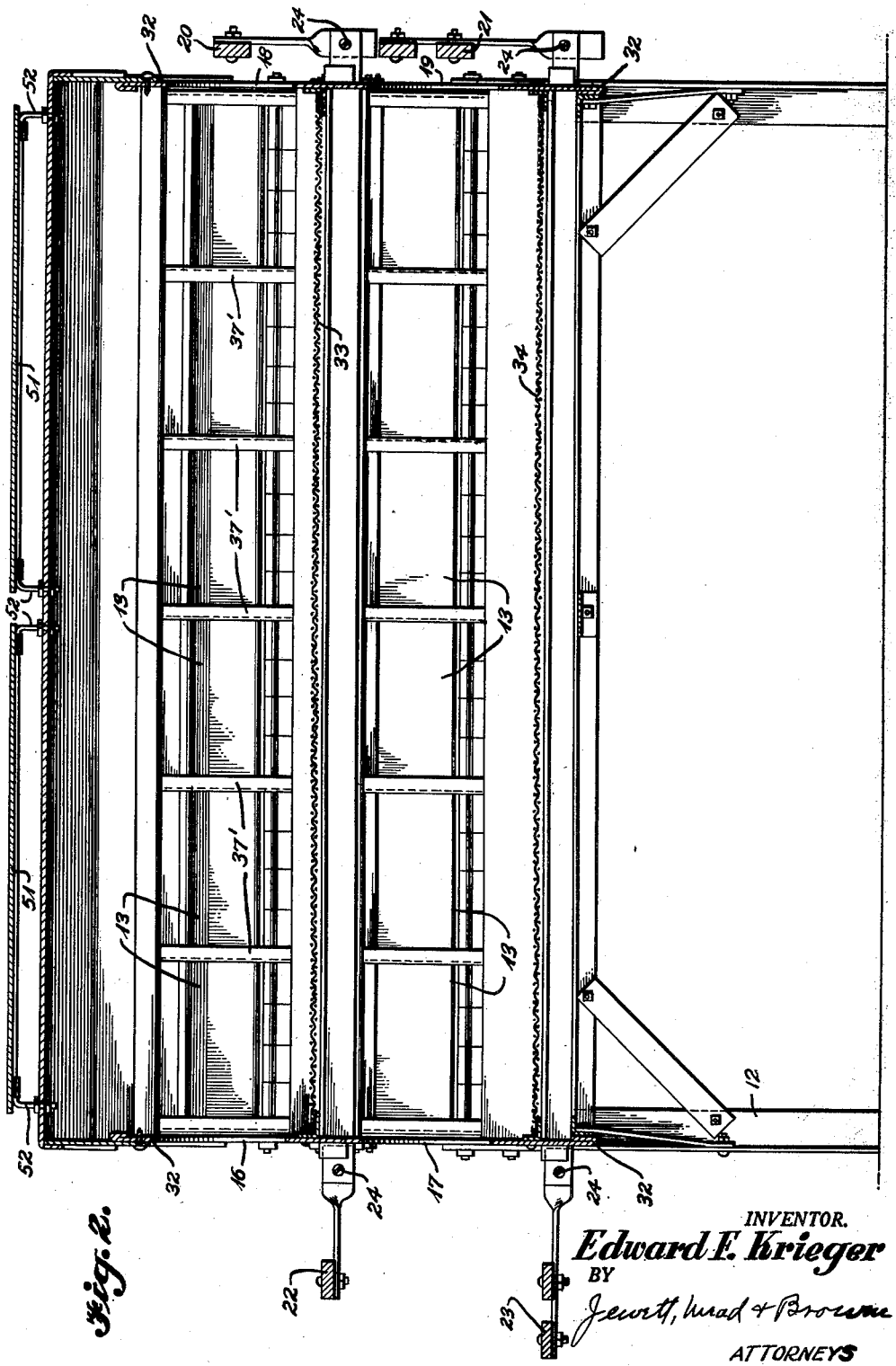

April 27, 1954    E. F. KRIEGER    2,676,566
HEN NEST BATTERY

Filed March 25, 1949    3 Sheets-Sheet 3

INVENTOR.
Edward F. Krieger
BY
ATTORNEYS

Patented Apr. 27, 1954

2,676,566

UNITED STATES PATENT OFFICE 2,676,566

HEN NEST BATTERY

Edward F. Krieger, St. Charles, Minn.

Application March 25, 1949, Serial No. 83,385

3 Claims. (Cl. 119—48)

The invention relates to hens' nests and has as an object the provision of a battery of nests.

It is an object of the invention to provide a battery of a plurality of nests in a self-contained structure providing an article for sale and use.

It is a further object to provide a battery of nests so combined as to provide in a self contained structure sufficient nests for a flock of hens of a number usually housed together.

It is a further object to provide nests of improved structure adapted for ready servicing and collection of eggs, with the eggs removed from access of the hens whereby the eggs will not become broken or soiled.

It is a further object to provide a novel nest bottom which will be sanitary, cool, and upon which eggs will not break.

It is a further object to provide an article of the class referred to of a construction such that it may be made largely of a material, as sheet metal, which will not harbor lice.

Further objects will appear from the following description, when read in connection with the accompanying drawings wherein:

Figure 2 is a longitudinal vertical section on line 2—2 of Figure 3;

Figure 1:
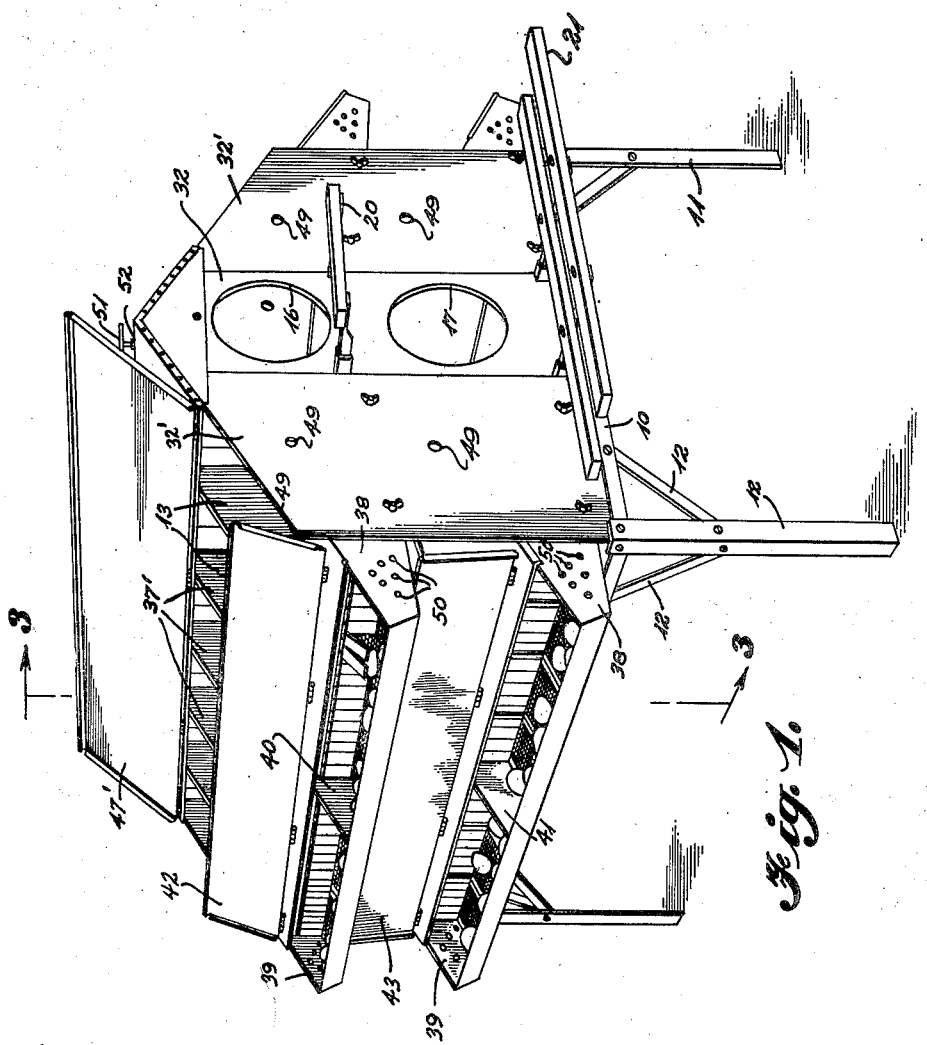
Figure 1 is a perspective view.

As as well known, floor space in an enclosure for housing laying hens is valuable. The floor is covered with a thick layer of litter and the grain is thrown into the litter to make the hens work for their food, whereby to get needed exercise.

To afford the necessary support for the nest assembly of the invention without substantially infringing on the usable floor space, there is shown a support for the assembly in the form of a frame 10 mounted on legs 11, braces 12 being provided to hold the legs in proper relation to the frame.

As shown the assembly is constructed to provide two decks or tiers A, B of nests vertically and two rows of nests in the tiers, laterally. The nest compartments 13 are shown as arranged at the sides of central runways 14, 15 accessible from both ends through holes 16, 17, 18, 19, perches 20, 21, 22, 23, being shown to which hens may fly from the floor in order to step into the runways.

As shown in Figure 2 the perches are pivotally mounted on bolts 24, whereby when the perches are raised as shown at the right of said figure there will not only be no threshold for the hens to light upon, but the platforms of the perches will bar the openings. The perches may be closed when it is time for the fowls to go to roost, to prevent broody individuals from spending the night on a nest. Also the perches may be closed when it is necessary to clean the nests in a manner to be described.

To define the runways and provide longitudinal frame members for the assembly there is shown a ridge member 25 formed of sheet metal with doubled edges 26 for stiffening; also longitudinal members 27, 28. End portions of the longitudinal members are shown as turned at 29, 30 and 31, to which the end plates of the assembly are secured as by spot welding. A vertical strip 32 in which the openings 16, 17 are formed is shown at each end of the assembly completing the closure of said ends, with the end plates 32'.

To serve as floors for the runways, there are shown foraminous elements 33, 34 lying on angles 35, 35' secured to the longitudinal frame members 27, 28, which elements 33, 34 are desirably formed of woven mesh screen material. Any dirt carried to the runways by the feet of the fowls may thus fall through to the floor.

To separate the nests, vertical partitions 37' are shown which are desirably coextensive with the end plates 32'.

To form supports for the nest bottoms 36, rods 37 are shown extending continuously through the partitions 37' and through the end plates 32', with nuts on said rods exposed at the outer surfaces of the plates 32'.

To provide egg storage chambers into which the eggs may roll as laid, end plates 38, 39 are shown as secured to and projecting from the end plates 32' and to provide additional supports for the egg chambers an intermediate plate 40, 41 is shown in each chamber projecting from a partition plate 37'. Hinged closures for the egg chambers are shown at 42, 43.

Figure 5:
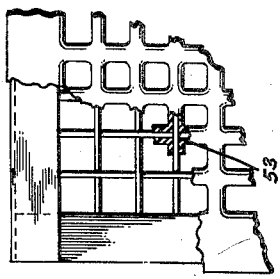
Figure 5 is a detail plan view, with parts broken away, of a portion of a nest bottom.

When a hen becomes "broody" egg production ceases. Broodiness is accompanied by a condition of fever. A well known cure for broodiness is to confine the fowl in an enclosure with a reticulated floor whereby to cool the fowl and reduce the fever. To lessen the tendency to broodiness nests with reticulate bottoms are desirable. But such nest bottoms of exposed metal provide a source of breakage of eggs dropped thereon. To avoid this hazard the nest bottom structure illustrated in Figure 5 is an important feature of applicant's invention. As there shown the material comprises a mesh material of woven or expanded metal dipped in latex 53 and partially vulcanized to provide a resilient coating of the metal.

As shown the thus formed nest bottoms 36, supported on rods 37 at one end, slope continuously into the egg chambers, upon an angle such that the eggs will roll gently into the chambers, away from access of the hens thereto.

Figure 3:
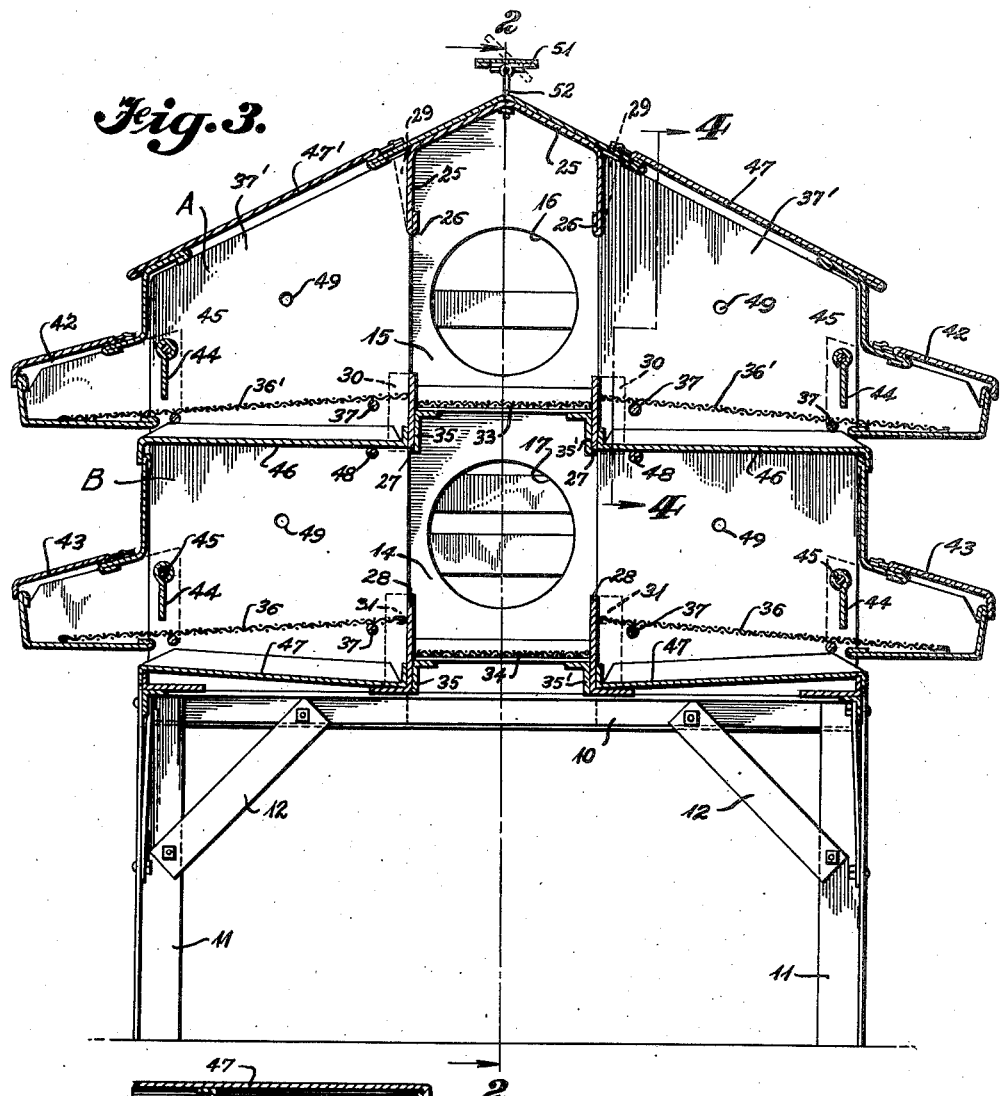
Figure 3 is vertical, transverse section on line 3—3 of Figure 1.
Figure 4:
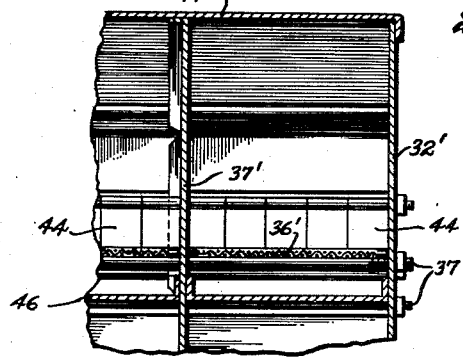
Figure 4 is a detail section on line 4—4 of Figure 3.

To separate the egg chambers from the nest chambers, flaps 44 are shown swingable on rods 45 extending continuously through the partitions and the end plates. As will be observed from Figs. 1 and 2, these flaps 44 are relatively narrow in width; and in the preferred embodiment shown, the flap width is substantially equal to the diameter of an egg whereby an egg need not swing more than two flaps to pass from a nest compartment to the egg chamber exterior thereof. The purpose of these flaps 44, of course, is to slow down the egg when it rolls so that it will not land in the egg chamber with too much force. As a matter of fact, and as can be observed from Fig. 3, the slope of the nest bottoms 36 is rather gentle and this factor coupled with the slowing action of the flaps 44 minimizes any tendency of the eggs to roll out from the next compartment to the exterior egg chamber while the eggs are still wet. In some instances the flaps 44 actually halt the egg for a short time, further insuring that the eggs do not roll out into the egg chamber prematurely. At the same time, the fact that there is a fixed slope for nest bottoms 36 means that the eggs do start to travel toward the exterior egg chambers even when the hen is in the nest compartment and thus the eggs get out to the exterior where they are cooled to room temperature. The factors of having the eggs get out to a cooler temperature without undue delay and at the same time not allowing them to roll too fast while they are wet results in fresher and cleaner eggs. When an egg rolls against one or two of the flaps, the force required to move the flap or flaps, though slight, is enough to slow down the motion of the gently rolling egg, whereby impact with an egg already in the egg chamber will not break either egg.

To catch dirt falling through the nest bottoms, upper trays 46 and lower tray 47 are shown, one of each between each pair of partitions. The inner ends of the trays 46 are shown as supported on rods 48 extending continuously through the partitions, and the inner ends of the trays 47 are shown as supported on angularly turned margins of members 28. The outer downturned ends of the trays are spaced below the bottoms of the egg chambers for ready withdrawal and cleaning.

To provide access to the interior of the assembly, hinged covers 47' are shown as forming a large portion of the roof of the assembly. These covers 47' may be swung open as shown in Figure 1 whereupon the upper nest bottoms may be freely lifted out, the trays 46 may be withdrawn, giving access to the lower nest bottoms 36 thus giving free access to the whole of the interior for cleaning.

For ventilation, openings 49 are desirably provided in the end plates 32' and in each partition plate at each side of each nest. Also ventilation holes 50 are desirably provided in the egg chamber end plates to assist in cooling the eggs.

To prevent fowls from roosting on the ridge of the device, there are shown plates 51 pivotally supported on supports 52. If a fowl seeks to roost on a plate 51 it will tilt and promptly discourage the attempt.

It will be seen that the lower perches 21 are more extensive than the upper perches 20 whereby a fowl may fly to the lower one first then from there to the upper without great exertion.

It will be obvious that the strips 32 may be omitted to leave the ends of the runways freely open. However, as is well known, hens prefer darkened nests and therefore the somewhat restricted entrances to the runways is preferred. The housing may be supported in spaced relation with the floor, by suspension from some overhead structure as the ceiling of the hen house.

The assembly may be limited to one story of nests, or more than two may be provided, to suit special conditions. These and other modifications may be made in the physical embodiment of the invention without departing from the spirit thereof within the scope of the appended claims.

I claim:

1. A hen nest structure comprising a multi-compartment housing, means to support said housing in spaced relation to a floor a distance sufficient to permit free access of fowls to the floor beneath said housing, said housing having a central open mesh runway supported by substantially parallel spaced apart support members extending longitudinally of said housing, a plurality of nest compartments opening from said runway on each side thereof, an egg chamber exterior of each compartment, a sloping nest bottom in each compartment, said nest bottom having one end extending into the egg chamber associated with said compartment, the opposite end of said nest bottom being located in said nest compartment and being at a fixed higher elevation than the end which extends into the egg chamber whereby said nest bottom slopes to cause eggs to roll into the egg chamber irrespective of whether or not a hen is in the nest compartment, and a plurality of swingable flaps separating the egg chamber from each compartment whereby the eggs are slowed down in their travel from a nest compartment to the egg chamber.

2. A hen nest structure according to claim 1, in which the nest bottom is of open mesh construction and rests freely on its supporting means whereby it may be readily lifted out for cleaning.

3. A hen nest structure comprising a multi-compartment housing having a plurality of tiers, each tier including a central open mesh runway supported by substantially parallel spaced apart support members extending longitudinally of said tier, a plurality of nest compartments opening from said runway at each side thereof, means to support said housing in spaced relation to a floor a distance sufficient to permit free access of fowls to the floor beneath said housing, a runway opening located at the end of each runway of a tier, a perch connected to said housing adjacent each runway opening, each lower perch extending farther from the housing than the perch immediately above it whereby fowls may ascend from tier to tier, said perches being swingably connected to the multi-compartment housing and being so located that they may be swung into position to bar the runway openings and thus prevent fowls from entering the runways.

References Cited in the file of this patent

UNITED STATES PATENTS

| Number | Name | Date |
|---|---|---|
| 1,176,243 | Price | Mar. 21, 1916 |
| 1,292,535 | Sweetland | Jan. 28, 1919 |
| 1,610,220 | Olson | Dec. 7, 1926 |
| 1,674,193 | Coltrin | June 19, 1928 |
| 1,926,133 | Anderson | Sept. 12, 1933 |
| 1,949,085 | Shallit | Feb. 27, 1934 |
| 1,968,658 | Stoddard | July 31, 1934 |
| 2,094,074 | Lee et al. | Sept. 28, 1937 |
| 2,279,147 | Stimson | Apr. 7, 1942 |
| 2,335,173 | Corey | Nov. 23, 1943 |
| 2,357,698 | Stafford | Sept. 5, 1944 |
| 2,501,475 | Muehlfeld | Mar. 21, 1950 |
| 2,512,861 | Hill | June 27, 1950 |